Oct. 30, 1923.

H. S. DICKINSON 1,472,515

GANG ADJUSTING DEVICE FOR HARROWS

Filed Nov. 6, 1919  6 Sheets-Sheet 1

Witness:
Harry S. Gaither

Inventor:
Harry S. Dickinson.
By Banning & Banning Atty's

Oct. 30, 1923.

H. S. DICKINSON

GANG ADJUSTING DEVICE FOR HARROWS

Filed Nov. 6, 1919

Witness:
Harry S. Gaither

Inventor.
Harry S. Dickinson.
By Banning & Banning
Attys

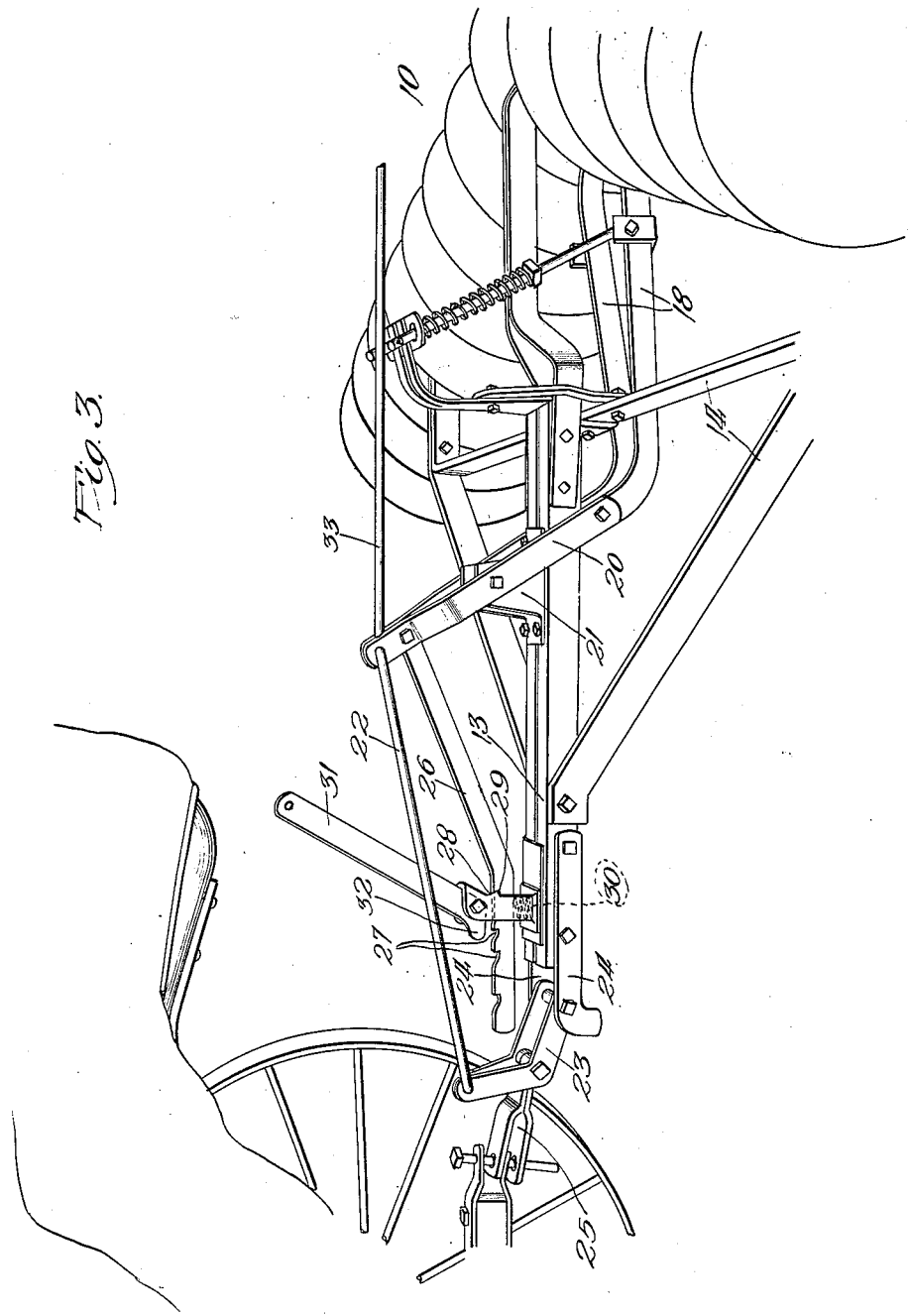

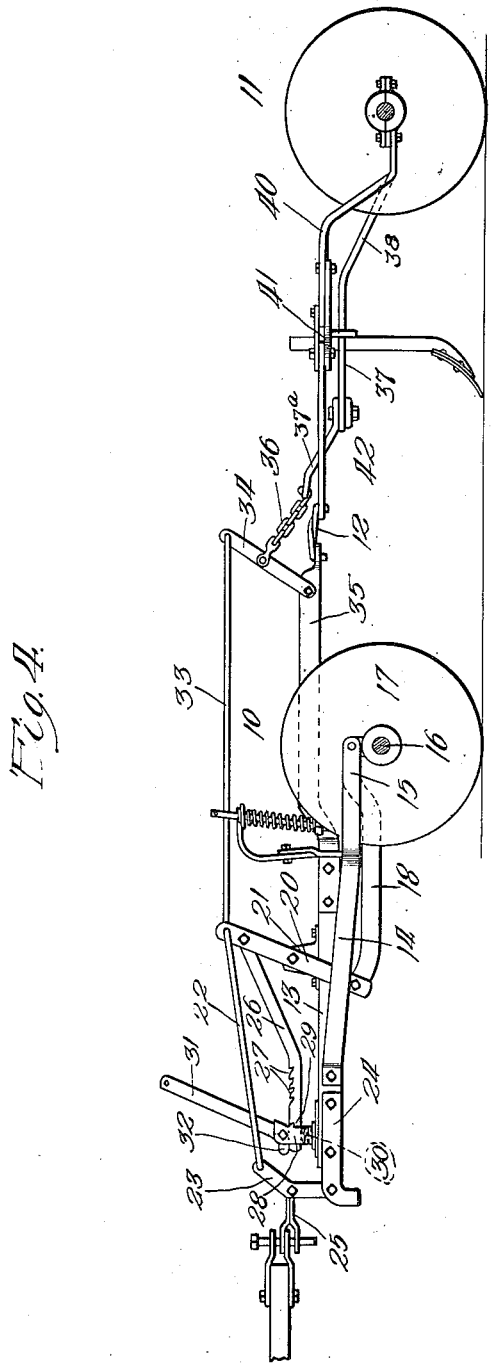

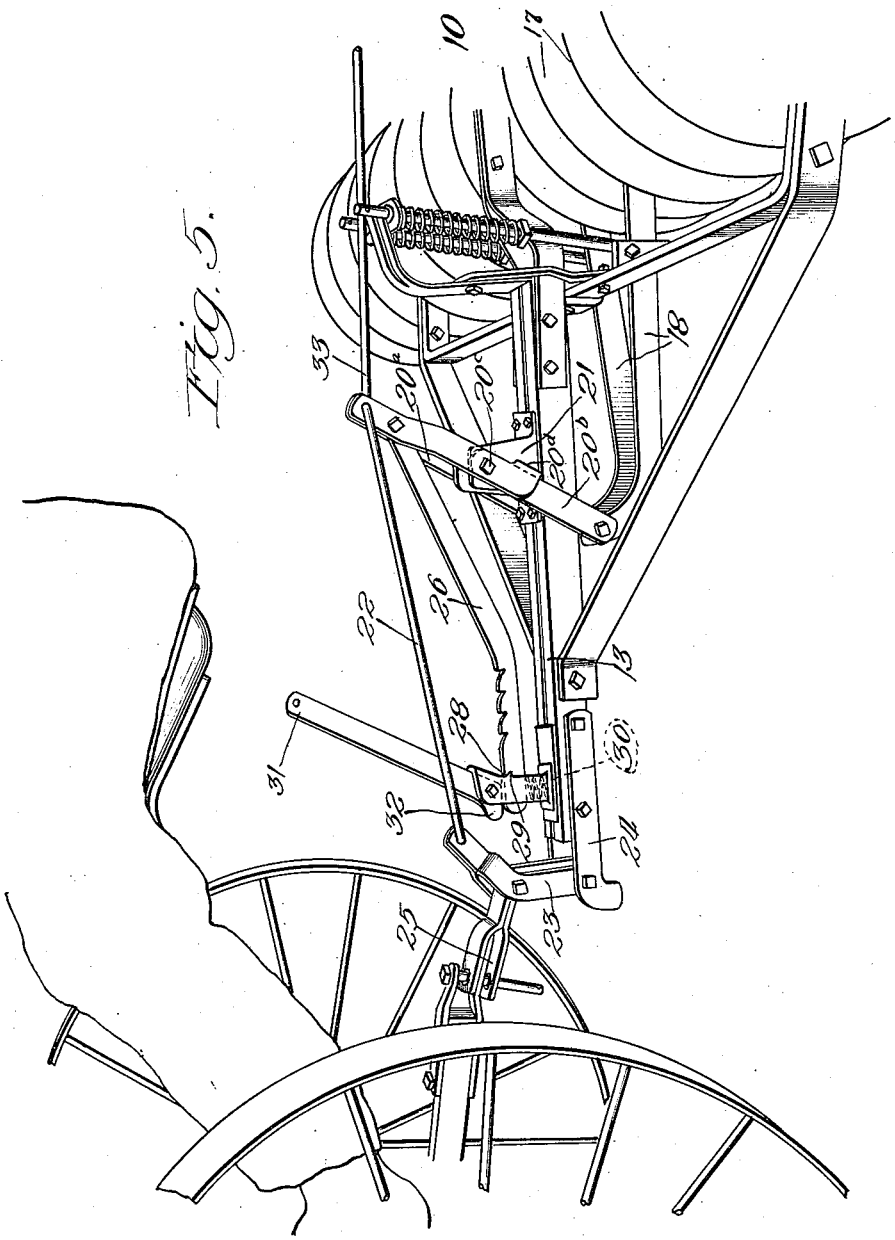

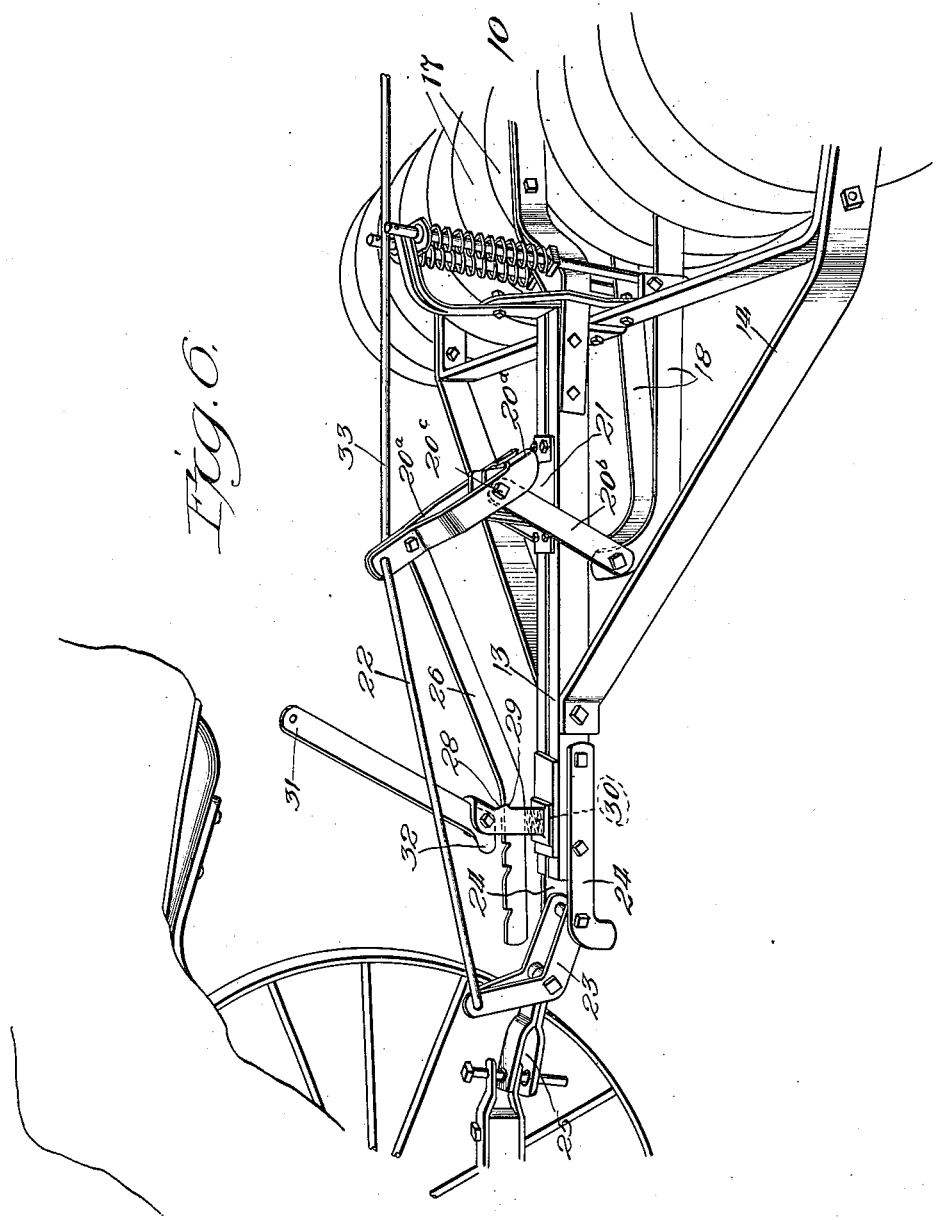

Patented Oct. 30, 1923.

1,472,515

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

GANG-ADJUSTING DEVICE FOR HARROWS.

Application filed November 6, 1919. Serial No. 336,090.

*To all whom it may concern:*

Be it known that I, HARRY S. DICKINSON, a citizen of the United States, residing at Moline, in the county of Rock Island and State of Illinois, have invented certain new and useful Improvements in Gang-Adjusting Devices for Harrows, of which the following is a specification.

This invention pertains to gang adjusting mechanism for harrows, preferably double cut harrows of the type disclosed in the Dickinson Patent, No. 1,115,410, of October 27, 1914; and the object of the present invention is to so design the devices employed for angling the disk gangs that this operation may be effected through the draft of the tractor or team and without the necessity of employing hand levers or the like which have customarily been used for the purpose.

A further object of the invention is to so arrange the adjusting means that the angling of the gangs can be effected from a point in advance of the harrow, preferably the driver's seat on the tractor. Although the hand adjustment of the gangs, in the case of horse drawn vehicles, was relatively satisfactory, since the driver's position enabled him to conveniently perform these adjusting operations, the use of tractors rendered the earlier methods of adjustment inconvenient and awkward, since the driver's position on the tractor either prevented him from reaching the hand levers or from conveniently adjusting them. If only one man operated both the tractor and harrow it was usually necessary for him to stop the tractor, dismount, and climb upon the harrow in order to make the adjustment, and then return to his position on the tractor before again starting across the field. Since it is often necessary to change the gang adjustments while traversing the field, and also to throw the gangs out of angle for turning purposes, the difficulty and loss of time occasioned by the use of ordinary hand levers can be well understood.

The present invention overcomes the difficulties noted by providing a single hand lever located at or near the front of the stub tongue, which lever is employed merely for the purpose of unlocking the parts preparatory to their automatic adjustment by power when the draft is again applied, which tripping or unlocking operation can readily and conveniently be performed without subjecting the driver to the burden of shifting the cumbersome disk gangs themselves.

In the drawings illustrating the invention:

Fig. 3 is a similar view showing the parts in the position occupied when the gangs are angled to harrowing position;

Fig. 4 is a side elevation of the implement with the gangs straightened;

Fig. 5 is a perspective view of the forward end of the front harrow unit showing a modified construction of the gang adjusting devices when the gangs are in straightened or parallel relation; and Fig. 6 is a similar view showing the position of the adjusting appliances in preparation for the angling of the front gangs.

Figure 1:
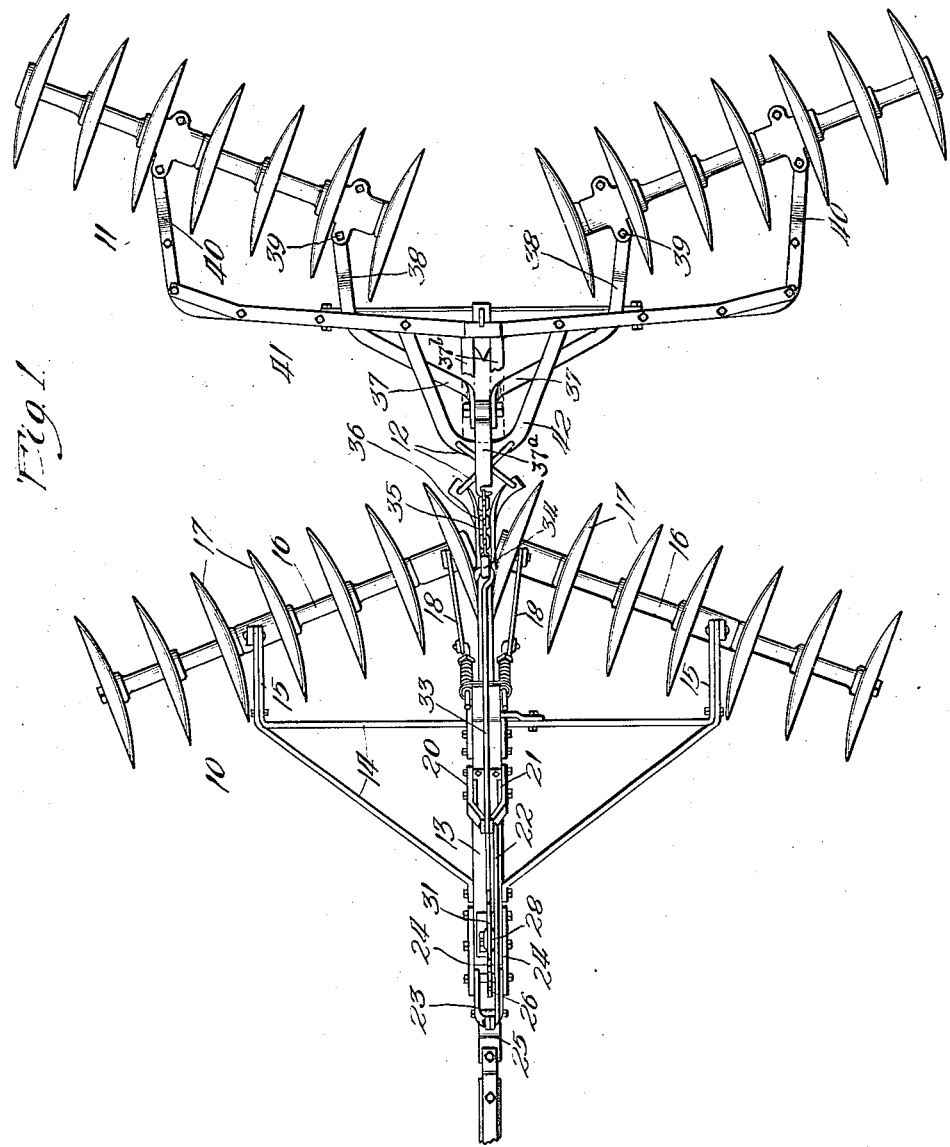
Figure 1 is a top or plan view of a double disk harrow embodying the features of the present invention.

Although the invention is one which may be employed, in so far as applicable, with a single cut harrow, it is peculiarly fitted for use in a double cut harrow, and is so illustrated in the drawings wherein 10 indicates the front unit, 11 the rear unit, and 12 the connecting links of a double cut harrow. The front unit, as shown, is an outthrow harrow, comprising a stub tongue 13 to which is secured a cross frame 14, the outer ends 15 of which are rearwardly turned and provide pivotal mountings for the gang shafts 16 which mount the disks 17. The inner ends of the gang shafts are adjusted by means of connecting bars 18—18, which underlie the tongue and are upturned at their forward ends and make connection with the bifurcated lower ends of an adjusting lever 20 which straddles and is pivoted to a bracket 21 upstanding from the stub tongue at a point well in advance of the gangs.

The upper end of the adjusting lever has connected thereto a draw rod 22 which makes connection with the upper end of an angled clevis member 23 of bifurcated formation, the lower ends of which are pivoted between plates 24 forwardly projecting from the front end of the stub tongue. The clevis member at its bend or angle has pivoted thereto a draft member 25 which makes connection with the draw rod of a tractor or other draft appliance, the arrangement being one that applies the draft well above the pivotal point of the clevis member, so that the draft will tend to draw forward the clevis member from the position shown in Fig. 2 to the position shown in Fig. 3, and these movements will be imparted to the adjusting lever 20, the upper end of which will be drawn forward, and the lower end thrust rearward by the adjustment of the clevis member.

In order to maintain the parts in adjusted relation, a ratchet bar 26 is provided, which is pivoted at its rear end to the upper end of the adjusting lever, and is provided near its forward end with a series of forwardly and upwardly projecting ratchet teeth 27. The forward end of the ratchet bar is entered through a ratchet box 28 mounted upon the stub tongue, which box is provided with a tooth 29 adapted to be engaged by any one of the ratchet teeth, such engagement being effected through the medium of a small spring 30, which is located within the ratchet box and bears against the under side of the ratchet bar, tending to thrust the ratchet bar upward into engagement with the tooth 29. In order to effect an unlatching of the ratchet teeth, a hand lever 31 is provided, the lower end of which is pivoted within the ratchet box at a point immediately above the ratchet bar, and the lever is provided with a foot 32 so arranged that when the lever is drawn forward the foot will bear against the forward end of the ratchet bar and depress the same against the tension of the spring 30, thereby unlatching the ratchet teeth, after which, if the clevis member be in the upstanding position shown in Fig. 2, the application of the draft will cause the parts to assume the position shown in Fig. 3, unless the parts be locked in one of the intermediate positions provided for.

In addition to the connecting bars 18, which serve to move the gangs of the front unit, means are provided for concurrently adjusting the gangs of the rear unit in reverse relation, so that the gangs will assume the arrangement shown in Fig. 1. Means for effecting the movement of the rear gangs will now be described.

To the upper end of the lever 20 is secured a rearwardly extending draw rod 33 which connects with the upper end of a lever 34, which upstands from and is mounted upon an extension 35 rearwardly projecting from the stub tongue and to which the connecting links 12 are secured. The lever 34 has connected thereto, near its upper end, a chain 36, the rear end of which is connected to the united forward ends of the diverging rear connecting bars 37, by means of a link 37ª which is guided between guide bars 37ᵇ, and the connecting bars are rearwardly bent or turned at their rear ends 38, and are secured by pivots 39 to the respective rear gangs at point near the inner ends thereof. The rear gang shafts are respectively pivoted to the rear turned ends 40 of a main rear frame 41, which is provided at its center with a U-shaped draft reach 42 to which the cross links 12 are pivoted.

Figure 2:
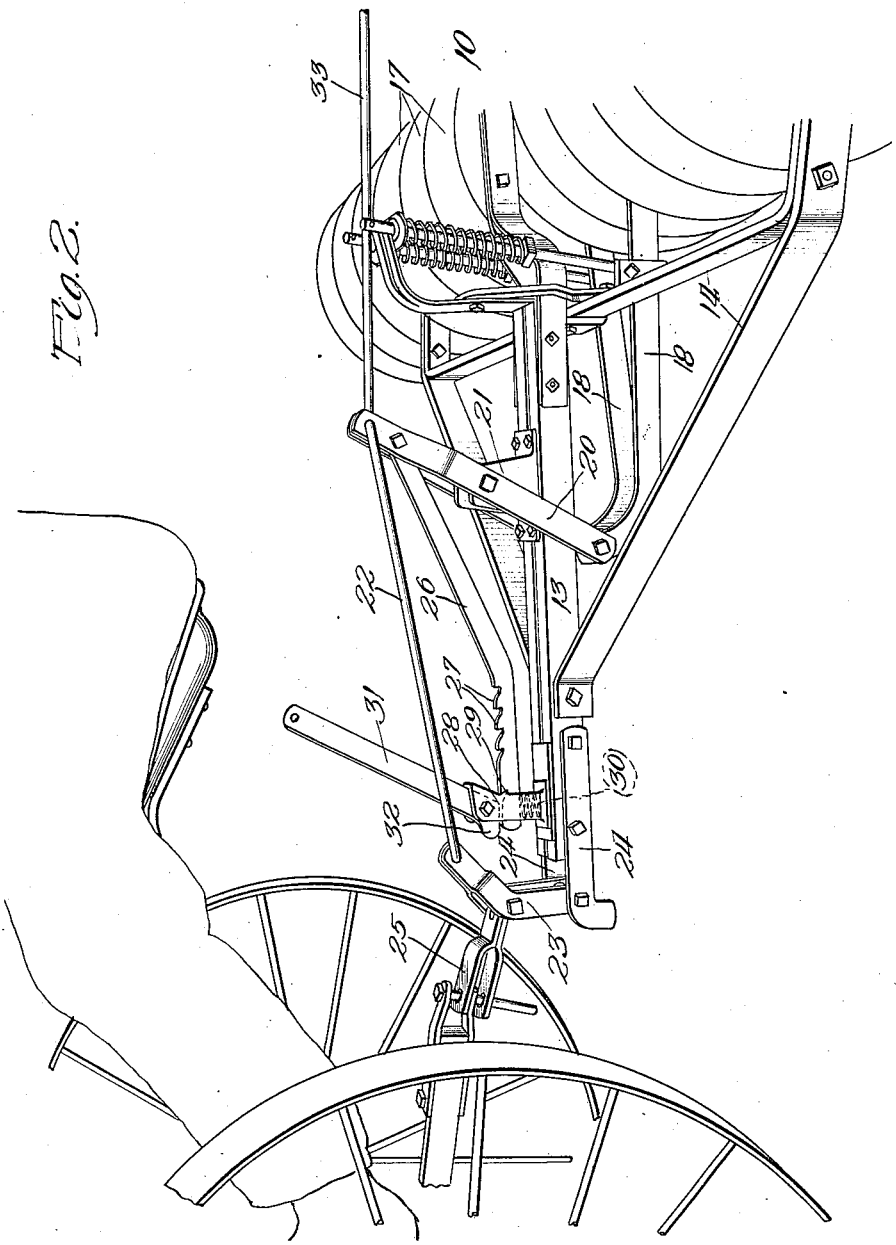
Fig. 2 is a perspective view of the forward end of the front harrow unit, showing the parts adjusted to the position assumed when the gangs are in straightened or parallel relation.

In the arrangement shown, as the front gangs are angled from the position shown in Fig. 2 to that shown in Fig. 3, the rear gangs will be concurrently angled in the opposite direction, through the medium of the draw rod 33, the lever 34, and the chain 36, which elements serve to draw forward the rear connecting bars 37, thereby angling the gangs to the desired degree, and these movements are in opposition to the thrust movements imparted through the front connecting bars 18.

When it is desired to throw the gangs out of angle, the latch lever 31 is operated to unlock the ratchet bar, after which a reversal of the draft will restore the front gangs to the straight position shown in Fig. 2, and the rear thrust of the draw rod 33 will impart a slack to the chain 36, which will permit the rear gangs to automatically swing back into straight relation, when the forward draft is again applied, which they will do, without the necessity for providing positive means as in the case of the front gangs. The provision of a chain connection is of advantage, in that it affords freedom in turning without the danger of cramping or binding the operative parts during the turning operation.

The adjustments shown are all effected through the control of the latch lever 31, which simply releases the parts at the proper time to utilize the application of the draft for effecting the actual adjustments. The latch features, in association with the use of the rod 22, which is designed to transmit a thrust as well as a pull, and the clevis member operable by draft in either direction, enable all the required adjustments to be effected without the necessity for the driver's dismounting or reconnecting the draft appliances as occasion may require.

In cases where it is deemed desirable to relieve the angling appliances from the strain incident to a concurrent angling of the front and rear gangs, and to effect these operations in succession, and particularly in heavy soils where the draft strain incident to such a concurrent adjustment is deemed excessive, the modification particularly illustrated in Figs. 5 and 6 may be employed.

In these figures, a construction is shown in which the adjusting lever is divided into an upper section 20ª and a lower section 20ᵇ, both sections being pivoted by a common pivot bolt 20ᶜ through the bracket 21. The upper section 20ª of the lever is bifurcated at its lower end and provided with an inturned stop flange 20ᵈ adapted, when the upper end of the upper lever section is thrust to the rear, to engage the rear edge of the lower lever section 20ᵇ and impart a forward movement thereto. When, however, the upper section is subjected to a forward pull, through the medium of the draw rod 22, the lever will break joints in the manner shown in Fig. 6, and such forward movement will have the effect of positively angling only the rear gangs, in the manner heretofore described, leaving the front gangs in unangled relation until the limit of movement afforded by the forward pull of the clevis member has been exhausted, after which the continued forward pull of the draft will advance the front frame of the harrow, and the ground resistance of the front gangs will cause them to swing into angled position as the implement advances. This action will have the effect of drawing back the lower section 20ᵇ of the divided lever until its free movement is stopped by its engagement with the stop or heel 20ᵈ of the upper lever, at which time the lever as a whole will occupy the same relative position as that illustrated in Fig. 3.

When it is desired to throw the gangs out of angle, a rear thrust on the clevis member will act immediately and positively through the lever as a whole on the front gang, and, as already described, will effect a slackening of the chain connection for the rear gang, so that thereafter a forward pull on the draft will bring the rear gangs into straight or unangled position.

With the construction last described, the angling and straightening adjustments of the front and rear gangs are in each case effected in succession rather than concurrently, and in each case are effected by means which act in part to effect a positive readjustment and in part to establish conditions which ultimately result in such a readjustment. In no case do the means shown in Figs. 5 and 6 in and of themselves, through positive action, operate to effect both adjustments, since the ultimate forward advance of the implement itself is relied upon to consummate the angling or straightening of either the front or rear set of gangs, as the case may be. The degree of adjustment can be regulated by latching the ratchet bar 26 in any desired position, and the hand operation for effecting the intended adjustments is in all respects similar to that heretofore described.

Although the mechanism is peculiarly adapted to double cut harrows, in that it affords a means for the adjustment of both front and rear gangs, nevertheless, the front adjusting mechanism can alone be used with a single harrow, the rear connections being dispensed with.

Although the invention has been described with particularity as to detail, it is not the intention that the same be limited to the specific features of construction of the front and rear harrow units, since these details are commonly varied in different makes of harrows, and can be changed or modified to meet recognized standard requirements. The adjusting features of the present invention, however, are applicable to double or single cut disk harrows of any well known type, without substantial change or modification.

I claim:

1. A tandem disk harrow having a front pair of gangs, a rear pair of gangs, draft mechanism to which the gangs are connected so that they may be set at various angles to the line of draft, and means associated with the draft mechanism and connected with the gangs movable to various positions to set the angle of the gangs relative to the line of draft, said means being adapted to be connected to a tractor or the like so that, when it is pulled forward by a tractor, it is set to a position for a working angle for the gangs, and, when pushed backward by a tractor or the like, it is set to a position for transport angle of the gangs.

2. A tandem disk harrow having a front pair of gangs, a rear pair of gangs, a draft mechanism to which the gangs are connected so that they may be set at various angles to the line of draft, said draft mechanism including movable portions serving, when pulled forward by a tractor or the like, to positively angle one pair of gangs to working position and to permit the other pair to move to working position, and, when pushed backward by a tractor or the like, to positively angle one pair of gangs to transport position and permit the other pair to move to transport position.

3. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, and a clevis to which the forward end of the draw rod is connected for imparting either a pull or a thrust to the draw rod, substantially as described.

4. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw rod is connected for imparting either a pull or thrust to the draw rod, and latch means for holding the parts in adjusted relation, substantially as described.

5. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw rod is connected for imparting either a pull or thrust to the draw rod, and latch means connected to the lever for holding the parts in adjusted relation, substantially as described.

6. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw rod is connected for imparting either a pull or thrust to the draw bar, and latch means for holding the parts in adjusted relation, said latch means including a hand lever adapted to release the latch and permit the adjustment of the gangs to be effected by the pull of the draft, substantially as described.

7. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw bar is connected for imparting either a pull or thrust to the draw rod, and latch means connected to the lever for holding the parts in adjusted relation, said latch means including a hand lever adapted to release the latch and permit the adjustment of the gangs to be effected by the pull of the draft, substantially as described.

8. In a harrow, the combination of a front unit comprising a harrow frame having a stub tongue and a pair of gangs movably mounted on the harrow frame, a rear unit comprising a rear frame and gangs movably secured to the rear frame, a connection between the two units, draw bars for adjusting the front gangs, a forward lever pivoted to the stub tongue to the lower end of which the draw bars are secured, a draw rod secured to the upper end of the lever, a clevis to which the forward end of the draw bar is secured, movements of the clevis serving to impart either a pull or a thrust to the draw rod, a rear lever, a rigid connection between the two levers for transmitting movement from one to the other, and connections, flexible in part, between the rear lever and the rear gangs for throwing the same into angle by pull on said partly flexible connections, substantially as described.

9. In a harrow, the combination of a front unit comprising a harrow frame having a stub tongue and a pair of gangs movably connected with the harrow frame, a rear unit comprising a rear frame and gangs movably secured to the rear frame, a connection between the two units, draw bars for adjusting the front gangs, a forward lever pivoted to the stub tongue to the lower end of which the draw bars are secured, a draw rod secured to the upper end of the lever, a clevis to which the forward end of the draw bar is secured, movements of the clevis serving to impart either a pull or a thrust to the draw rod, a rear lever, a rigid connection between the two levers for transmitting movement from one to the other, connections, flexible in part, between the rear lever and the rear gangs for throwing the same into angle by pull on said partly flexible connections, and latch mechanism for holding the parts in adjusted relation, said latch mechanism including a hand lever mounted at the forward end of the stub tongue and adapted to release the latch to permit the front and rear gangs to be adjusted under draft, substantially as described.

10. In a harrow, the combination of a frame, a disk gang movably mounted on the frame, an adjustable clevis member connected with the frame, a jointed lever member, a rigid connection between the clevis and one portion of the jointed lever member, and a connection between the other portion of the jointed lever member and the disk gang for positively adjusting the gang in one direction by a movement of both lever sections in unison, and effecting an adjustment of the gang in the opposite direction by the action of the ground resistance, tending to take up the free movement between the lever sections, substantially as described.

11. In a harrow, the combination of a frame, a disk gang movably mounted on the frame, an adjustable clevis member connected with the frame, a jointed lever member, a rigid connection between the clevis and the upper end of the jointed lever member, a draw bar between the gang and lower end of the jointed lever member, a stop member for effecting a joint movement of the lever sections in one direction only, with a corresponding adjustment of the gang, the lever members being correlated to effect a gang adjustment in the opposite direction through the action of ground resistance, substantially as described.

12. In a disk harrow, the combination of front and rear disk gangs movably connected to the frame, a clevis member connected to the frame, a jointed lever, a rigid connection between the clevis and one section of the jointed lever, a connection between one section of the lever and the front disk gang, and a connection between the other section of the lever and the rear disk gang, each of said connections acting positively to adjust its associated gang in one direction only and permitting adjustment of the associated gang in the opposite direction by the action of ground resistance when the jointed lever is readjusted, substantially as described.

13. In a disk harrow, the combination of front and rear disk gangs movably connected to the frame, a clevis member connected to the frame, a jointed lever, a rigid connection between the clevis and one section of the jointed lever, a connection between one section of the lever and the front disk gang, and a connection between the other section of the lever and the rear disk gang, each of said connections acting positively to adjust its associate gang in one direction only and permitting adjustment of the associated gang in the opposite direction by the action of ground resistance when the jointed lever is readjusted, the adjusting of the jointed lever in either position effecting the positive adjustment of one only of the gangs, substantially as described.

14. In a disk harrow, the combination of a frame, a pair of companion disk gangs movably secured to the frame, a draw bar for each of the disk gangs, a jointed lever pivoted with respect to the frame, to the lower section of which lever the draw bars are connected, stop means for the lever sections to cause the same to move in unison in one direction only, a draw rod connected to the upper end of the lever, a clevis to which the forward end of the draw rod is connected for imparting either a pull or a thrust to the draw rod, the arrangement being one which causes a positive adjustment of the companion gangs when the lever sections are moved in unison, and an adjustment through the action of ground resistance when the lever sections are adjusted to break joints, substantially as described.

15. In a disk harrow, the combination of a frame, a pair of companion disk gangs movably secured to the frame, a draw bar for each of the disk gangs, a jointed lever pivoted with respect to the frame, to the lower section of which lever the draw bars are connected, stop means for the lever sections to cause the same to move in unison in one direction only, a draw rod connected to the upper end of the lever, a clevis to which the forward end of the draw bar is connected for imparting either a pull or a thrust to the draw rod, the arrangement being one which causes a positive adjustment of the companion gangs when the lever sections are moved in unison, an adjustment through the action of ground resistance when the lever sections are adjusted to break joints, and latch means connected with the upper lever section for holding the parts in adjusted relation, substantially as described.

16. In a disk harrow, the combination of a pair of companion front disk gangs, a jointed lever to one section of which the front gangs are connected, a pair of companion rear disk gangs, connections between the other lever section and the rear disk gangs, both of said connections being of a nature to afford positive movement in one direction only, and draft operated means for moving the lever, the front and rear gangs respectively being alternately positively and non-positively adjusted by alternate movements of the lever, substantially as described.

HARRY S. DICKINSON.